United States Patent Office 2,723,291
Patented Nov. 8, 1955

2,723,291

TREATMENT OF GLUTAMIC ACID-CONTAINING HYDROLYSATES

William E. Jones, Glenview, Ill., assignor to International Minerals & Chemical Corporation, a corporation of New York No Drawing. Application February 19, 1954,
Serial No. 411,547

8 Claims. (Cl. 260—529)

The present invention relates to processes involving the sulfuric acid hydrolysis of materials containing glutamic acid precursor compounds and to the production of amino acids. More particularly, the instant invention relates to processes in which increased yields of glutamic acid are recovered from sulfuric acid hydrolysates of proteinaceous material.

Hydrolysis of proteinaceous material, either animal or vegetable, is conventionally accomplished by heating the protein under appropriate conditions with mineral acids, such as sulfuric acid or hydrochloric acid. The resulting hydrolysate may be treated in various ways in order to produce individual amino acids or mixtures of amino acids. Such products are useful as nutrient compositions and for other purposes.

The isolation of individual amino acids is conventionally accomplished by neutralizing the acidic hydrolysate with an inorganic alkali metal or alkaline earth metal oxide or hydroxide in order to adjust the pH of the hydrolysate to or near the isoelectric point of the particular amino acid desired to be recovered. For example, tyrosine, leucine, isoleucine, and others are crystallized from protein hydrolysates having a pH between about 5.0 and about 8.0. The solution from which these amino acids have been separated is adjusted to a pH of about 3.2 in order to crystallize glutamic acid.

Among the conventional processes for the treatment of protein hydrolyzed with sulfuric acid may be mentioned that described in U. S. 2,533,114, issued to Hoglan. In this process, a protein material, such as gluten, is hydrolyzed with sulfuric acid, and the resulting hydrolysate is adjusted to a pH between about 10.5 and about 12.0 with an alkaline earth metal compound, such as calcium hydroxide. Insoluble material comprising alkaline earth metal sulfate and humin is formed and is separated from the hydrolysate. Excess alkaline earth metal ions, such as calcium ions, are removed from the alkaline solution by precipitating with a reagent selected from the group consisting of sulfur dioxide, alkali metal sulfites and bisulfites at a pH between about 8.0 and about 9.0. The precipitate which forms is separated from the solution, which is then concentrated. Amino acids, such as tyrosine and leucine, are crystallized from the concentrated solution. After separation of the amino acids, the solution is adjusted to a pH of about 3.2 with hydrochloric acid at which point glutamic acid is crystallized and separated.

One of the disadvantages inherent in this process arises from the use of alkali metal-containing reagents which are used for various pH adjustments. Because of the presence of ash forming constituents, the extent to which the end liquor, from which glutamic acid has been crystallized and separated, can be concentrated is limited, and generally between about 15% and about 30% of the glutamic acid originally present in the hydrolysate is lost in the end liquor. In addition, the amino acid and the inorganic precipitates separated from the hydrolysate contain glutamic acid which is lost. For example, the sulfite precipitate generally contains between about 4% and about 5% of the glutamic acid originally present in the sulfuric acid hydrolysate and this glutamic acid cannot be recovered by washing the precipitate even though large volumes of water are used for the washing. Generally the tyrosine-leucine precipitate contains about 5% of the glutamic acid originally present in the hydrolysate.

It is an object of the instant invention to provide improved processes for the treatment of sulfuric acid hydrolysates of materials containing glutamic acid precursor compounds wherein amino acids are recovered therefrom.

It is a further object of the instant invention to provide improved processes for the treatment of sulfuric acid hydrolysates of protein in order to recover glutamic acid therefrom.

It is a further object of the instant invention to provide processes involving sulfuric acid hydrolysis of protein wherein yields of glutamic acid are increased between about 10% and about 20%.

It is a further object of the instant invention to provide improved processes for the recovery of glutamic acid from hydrolysates in which losses of glutamic acid with solid fractions precipitated and separated from the hydrolysate are minimized.

These and other objects of the instant invention will become more apparent as hereinafter described.

In a practice of the instant invention, material containing glutamic acid precursor compounds, such as animal or vegetable protein, for example wheat gluten or corn gluten, is subjected to hydrolysis with sulfuric acid, and the pH of the resulting hydrolysate is adjusted to between about 8.0 and about 12.0 with an alkaline earth metal hydroxide or oxide. The sulfate ions present in the hydrolysate are precipitated along with humin and are separated from the alkaline hydrolysate, for example by filtration. The resulting solution contains an excess of alkaline earth metal ions, such as calcium, and these are at least partially removed by adding sufficient reagent which reduces the pH of the solution to between about 4.5 and about 7.5 and which forms a water insoluble salt of the alkaline earth metal under the conditions obtaining. The preferred reagents are selected from the group consisting of sulfur dioxide or sulfurous acid formed by dissolving sulfur dioxide in water, and carbon dioxide, to the solution to produce a pH between about 4.5 and about 7.5. An alkaline earth metal salt, such as calcium sulfite or calcium carbonate, precipitates from the resulting solution and is separated, for example by filtration.

This alkaline earth metal salt, such as calcium sulfite, normally contains between about 4% and about 5% of the glutamic acid originally present in the sulfuric acid hydrolysate. It has been discovered that the glutamic acid content of this precipitate is liberated by treatment with mineral acid, and the glutamic acid content is recoverable. For example, a calcium sulfite precipitate separated from the hydrolysate as described above is treated with mineral acid, such as sulfuric acid, hydrochloric acid, or the like, to liberate the glutamic acid present in the precipitate. In one embodiment of the instant process, the calcium sulfite precipitate, which has been separated from the hydrolysate, is combined with glutamic acid-containing material at a point prior to the neutralization of the sulfuric acid hydrolysate with the alkaline earth metal compound. The glutamic acid present in the cake is liberated upon disintegration of the cake by the mineral acid and is recovered from the resulting glutamic acid enriched hydrolysate. In a continuous process, the calcium sulfite precipitate is recycled to the process at a point prior to the addition of alkaline compounds to the sulfuric acid hydrolysate. By practicing the instant invention, only about 0.1%, rather than about 5%, of the glutamic acid originally present in the hydrolysate is lost due to the separation of the inorganic precipitate.

The solution from which the inorganic precipitate has been separated is then concentrated, for example by evaporation, preferably at a temperature not exceeding about 65° C., to a specific gravity between about 1.10 and about 1.20. The concentrated solution or filtrate contains amino acids, such as tyrosine, leucine, isoleucine, and others. Amino acids, such as tyrosine and leucine, are separated from the concentrated solution by crystallization at a pH between about 4.5 and about 7.5 and are separated by filtration.

In conventional processes, normally about 5% of the original glutamic acid present in the hydrolysate was lost in the precipitate containing the tyrosine and leucine. However, in practicing the instant invention, only about 2% of the original glutamic acid is found in this tyrosine-leucine cake. This is due to the fact that the hydrolysate is not concentrated to the usual extent and glutamic acid can be more completely separated from these amino acids.

The solution from which the tyrosine and leucine have been crystallized is then further concentrated prior to reduction of the pH to the isoelectric point of glutamic acid. For example, the solution is concentrated to a specific gravity between about 1.20 and about 1.45, preferably about 1.25. Concentration of the solution can be carried out to a greater extent in this process than in known processes, because of the more complete removal of the organic and inorganic material from the hydrolysate and due to the absence of ash forming constituents therein. The concentrated solution is then adjusted to a pH between about 2.5 and about 3.5, preferably about 3.2. Glutamic acid is crystallized and separated from the resulting solution. The solution from which the glutamic acid has been separated is known as glutamic acid end liquor and comprises a heterogeneous mixture of amino acids including glutamic acid, glycine, alanine, and others. This end liquor has a very low content of ash forming constituents.

The instant process involves the sulfuric acid hydrolysis of materials containing glutamic acid precursor compounds, such as animal or vegetable proteins and concentrated Steffen's filtrate. For example, suitable proteins include wheat gluten, corn gluten, soya bean meal, cottonseed meal, casein, albumen, and the like. The amount and concentration of sulfuric acid employed for the hydrolysis will depend upon the temperature and duration of the hydrolysis. A particularly effective hydrolytic reagent comprises about 50% aqueous sulfuric acid solution. The temperature of hydrolysis is generally between about 100° C. and about 140° C., preferably between about 110° C. and about 120° C. Following the hydrolysis, a sufficient amount of agent selected from the group consisting of alkaline earth metal oxide or hydroxide is added to produce a pH between about 8.0 and about 12.0. The aforesaid alkaline reagents include the oxides and hydroxides of calcium, barium, strontium, etc. However, the calcium compounds are preferred. Following the addition of the alkaline earth metal compounds to the hydrolysate, insoluble matter, which is formed and which includes alkaline earth metal sulfate and insoluble organic matter known as humin, is separated from the hydrolysate, for example by filtration. Alkaline earth metal compound, such as calcium, is then separated from the hydrolysate in the form of the insoluble sulfite or carbonate, preferably as the sulfite. In carrying out the present invention, the alkaline solution from which the insoluble matter has been removed at a pH between about 8.0 and about 12.0, preferably about 11.0, is treated with sufficient sulfur dioxide, sulfurous acid, or carbon dioxide, preferably sulfur dioxide, to obtain a pH between about 4.5 and about 7.5, preferably between about 4.5 and about 6.0, when sulfur dioxide or sulfurous acid is employed, and preferably between about 6.0 and about 7.5 if carbon dioxide is employed. The calcium salt which precipitates is separated, for example by filtration.

This precipitate which generally contains between about 4% and about 5% of the glutamic acid initially present in the hydrolysate is then treated with mineral acid. In a preferred practice of the invention it is combined with an acidic protein hydrolysate or in a continuous process is recycled to a point in the process prior to the adjustment of the sulfuric acid hydrolysate to a pH of between about 10.5 and about 12.0. It is preferably recycled to the acidic mixture obtained on hydrolysis of the protein with sulfuric acid. However, it can be combined with or recycled to the proteinaceous raw material prior to its hydrolysis with the sulfuric acid.

In practicing the instant process, the liquor from which the sulfite precipitate has been separated is then concentrated to a specific gravity between about 1.10 and about 1.20, preferably about 1.15, in any desired type of evaporating equipment, for example a vacuum pan, at a temperature not exceeding about 70° C., preferably at between about 40° C. and about 60° C. Tyrosine and leucine crystallize from the resulting concentrated hydrolysate and are separated, for example by filtration. The resulting solution from which the tyrosine and leucine have been separated is then further concentrated to a specific gravity between about 1.20 and about 1.45, preferably about 1.25, at a temperature of about 70° C. The concentrated liquor is then adjusted, for example with sulfuric acid, to a pH of about 3.2, at which point glutamic acid crystallizes and is separated from the liquor.

The following examples are presented in order to afford a clearer understanding of the practice of the instant invention, but it is understood that they are illustrative only and there is no intention to limit the invention thereto.

*Example I*

About 1 part of wheat gluten was admixed with about 2 parts of about 50% aqueous sulfuric acid, and the resulting mixture was heated at about 135° C. for about 2 hours. Sufficient calcium hydroxide was added to the resulting hydrolysate to produce a pH of about 11.0. A precipitate consisting largely of calcium sulfate and humin was separated from the resulting hydrolysate by filtration. The resulting solution was treated with sufficient sulfur dioxide to reduce the pH to about 5.3. The calcium sulfite precipitate which formed was separated by filtration and was combined with additional sulfuric acid hydrolysate which was treated in the above described manner. The solution from which the calcium sulfite precipitate had been separated was then evaporated to a specific gravity of about 1.15, and tyrosine-leucine precipitated and was separated by filtration and washed. The filtrate from which the tyrosine and leucine had been separated, along with the wash water, was then concentrated to a specific gravity of about 1.25, and sufficient aqueous 50% sulfuric acid was added to the concentrated solution to produce a pH of about 3.2. Glutamic acid crystallized and was separated from the resulting solution. The recovery of glutamic acid was about 85%.

In conventional glutamic acid recovery processes in which the calcium sulfite precipitate is not recycled and in which there is no evaporation after the removal of tyrosine and leucine, recoveries of glutamic acid are a maximum of about 72%.

*Example II*

About 1 part of corn gluten was admixed with about 2 parts of about 50% aqueous sulfuric acid, and the resulting mixture was heated at about 120° C. for about 4 hours. Sufficient calcium hydroxide was added to the resulting hydrolysate to produce a pH of about 11.0. A precipitate consisting largely of calcium sulfate and humin was separated from the resulting hydrolysate by filtration. The resulting solution was treated with sufficient sulfurous acid to reduce the pH to about 5.3. The calcium sulfite precipitate which formed was separated by filtration, and was recycled to the sulfuric acid hydrolysate which was treated in the above described manner. The solution from which the calcium sulfite had been separated was then evaporated to a specific gravity of about 1.15, and tyrosine-leucine precipitated and was separated by filtration and washed. The filtrate from which the tyrosine and leucine had been separated, along with the wash water, was then concentrated to a specific gravity of about 1.25, and sufficient aqueous 50% sulfuric acid was added to the concentrated solution to produce a pH of about 3.2. Glutamic acid crystallized and was separated from the resulting solution. The recovery of glutamic acid was about 81%.

In conventional glutamic acid processes in which a calcium sulfite precipitate is separated, but in which it is not recycled to the process and in which there is no evaporation after the removal of tyrosine and leucine, recoveries of glutamic acid are a maximum of about 64%. Where specific gravity is mentioned in the description and claims is meant the specific gravity at about 70° C.

Having thus fully described and illustrated the character of the instant invention, what is desired to be protected by Letters Patent is:

1. In a process involving hydrolysis with sulfuric acid of material containing glutamic acid precursor compounds, followed by treating the hydrolysate with a sufficient amount of an oxygen containing basic alkaline earth metal compound to produce a pH between about 8.0 and about 12.0, and separating insoluble material therefrom, the improvements comprising treating the hydrolysate from which insoluble material has been separated with sufficient acidifying reagent selected from the group consisting of sulfur dioxide, and carbon dioxide to reduce the pH to between about 4.5 and about 7.5, separating the alkaline earth metal precipitate which contains a significant amount of glutamic acid from the resulting hydrolysate, treating the precipitate with a mineral acid, and recovering glutamic acid from the resulting solution.

2. In a process involving hydrolysis with sulfuric acid of material containing glutamic acid precursor compounds, followed by treating the hydrolysate with a sufficient amount of an agent selected from the group consisting of alkaline earth metal oxide and hydroxide to produce a pH between about 8.0 and about 12.0, and separating insoluble material therefrom, the improvements comprising treating the hydrolysate from which insoluble material has been separated with sufficient acidifying reagent selected from the group consisting of sulfur dioxide, and carbon dioxide to reduce the pH to between about 4.5 and about 7.5, separating the alkaline earth metal sulfite precipitate which contains a significant amount of glutamic acid from the resulting hydrolysate, and returning the sulfite precipitate to the process at a point prior to adjustment of the sulfuric acid hydrolysate to a pH between about 8.0 and about 12.0.

3. In a process involving the hydrolysis with sulfuric acid of proteinaceous material followed by treating the hydrolysate with a sufficient amount of an agent selected from the group consisting of alkaline earth metal oxide and hydroxide to produce a pH between about 8.0 and about 12.0, and separating insoluble material therefrom, the improvements comprising treating the hydrolysate from which insoluble material has been separated with sufficient reagent selected from the group consisting of sulfur dioxide, and carbon dioxide to reduce the pH to between about 4.5 and about 7.5, separating the alkaline earth metal sulfite precipitate from the resulting hydrolysate, treating the precipitate with a mineral acid, and recovering glutamic acid from the resulting solution.

4. In a process involving the hydrolysis with sulfuric acid of proteinaceous material, followed by treating the hydrolysate with a sufficient amount of an agent selected from the group consisting of calcium oxide and hydroxide to produce a pH between about 8.0 and about 12.0, and separating insoluble material therefrom, the improvements comprising treating the hydrolysate from which insoluble material has been separated with sufficient sulfur dioxide to reduce the pH to between about 4.5 and about 7.5, separating the calcium sulfite precipitate from the resulting hydrolysate, and returning the sulfite precipitate to the process at a point prior to the adjustment of the sulfuric acid hydrolysate to a pH between 8.0 and about 12.0.

5. In a process involving the hydrolysis with sulfuric acid of proteinaceous material, followed by treating the hydrolysate with a sufficient amount of an agent selected from the group consisting of calcium oxide and hydroxide to produce a pH between about 8.0 and about 12.0, and separating insoluble material therefrom, the improvements comprising treating the hydrolysate from which insoluble material has been separated with sufficient carbon dioxide to reduce the pH to between about 6.0 and about 7.5, separating the calcium carbonate precipitate from the resulting hydrolysate, and returning the precipitate to the process at a point prior to the adjustment of the sulfuric acid hydrolysate to a pH between about 8.0 and about 12.0.

6. In a process involving the hydrolysis with sulfuric acid of proteinaceous material followed by treating the hydrolysate with a sufficient amount of an agent selected from the group consisting of alkaline earth metal oxide and hydroxide to produce a pH between about 8.0 and about 12.0, and separating insoluble material therefrom, the improvements comprising treating the hydrolysate from which insoluble material has been separated with sufficient reagent selected from the group consisting of sulfur dioxide and carbon dioxide to reduce the pH to between about 4.5 and about 7.5, separating the alkaline earth metal sulfite from the resulting hydrolysate, returning the sulfite precipitate to the process at a point prior to the adjustment of the sulfuric hydrolysate to a pH between about 8.0 and about 12.0, concentrating the solution from which the sulfite has been separated to a sepecific gravity between about 1.10 and about 1.20, separating amino acids which crystallize from the resulting solution, concentrating the resulting solution from which the amino acids have been separated to a specific gravity between about 1.20 and about 1.45, adjusting the pH of the concentrated solution to between about 2.5 and about 3.5, and separating the glutamic acid which crystallizes therefrom.

7. In a process involving the hydrolysis with sulfuric acid of wheat gluten followed by treating the hydrolysate with a suffiicent amount of an agent selected from the group consisting of calcium oxide and hydroxide to produce a pH between about 8.0 and about 12.0, and separating insoluble material therefrom, the improvements comprising treating the hydrolysate from which insoluble material has been separated with sufficient sulfur dioxide to reduce the pH to between about 4.5 and about 7.5, separating the calcium sulfite from the resulting hydrolysate, returning the sulfite precipitate to the process at a point prior to the adjustment of the sulfuric acid hydrolysate to a pH between about 8.0 and about 12.0, concentrating the solution from which the sulfite has been separated to a specific gravity between about 1.10 and about 1.20, separating amino acids which crystallize from the resulting solution, concentrating the resulting solution from which the amino acids have been separated to a specific gravity between about 1.20 and about 1.45, adjusting the pH of the concentrated solution to a pH between about 2.5 and about 3.5, and separating the glutamic acid which crystallizes therefrom.

8. In a process involving the hydrolysis with sulfuric acid of corn gluten followed by treating the hydrolysate with a sufficient amount of an agent selected from the group consisting of calcium oxide and hydroxide to produce a pH between about 8.0 and about 12.0, and separating insoluble material therefrom, the improvements comprising treating the hydrolysate from which insoluble material has been separated with sufficient sulfur dioxide to reduce the pH to between about 4.5 and about 7.5, separating the calcium sulfite from the resulting hydrolysate, returning the sulfite precipitate to the process at a point prior to the adjustment of the sulfuric acid hydrolysate to a pH between about 8.0 and about 12.0, concentrating the solution from which the sulfite has been separated to a specific gravity between about 1.10 and about 1.20, separating amino acids which crystallize from the resulting solution, concentrating the resulting solution from which the amino acids have been separated to a specific gravity between about 1.20 and about 1.45, adjusting the pH of the concentrated solution to a pH between about 2.5 and about 3.5, and separating the glutamic acid which crystallizes therefrom.

References Cited in the file of this patent

UNITED STATES PATENTS 2,647,142    Hoglan _____ July 28, 1953